(12) United States Patent
Cavazos

(10) Patent No.: US 11,726,168 B2
(45) Date of Patent: Aug. 15, 2023

(54) SQUINT-OFFSETTING RADAR MOUNTING TAB CAPS

(71) Applicant: Aptiv Technologies Limited, St. Michael (BB)

(72) Inventor: Sara J. Cavazos, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 224 days.

(21) Appl. No.: 16/825,267

(22) Filed: Mar. 20, 2020

(65) Prior Publication Data

US 2021/0293920 A1  Sep. 23, 2021

(51) Int. Cl.
*G01S 7/03* (2006.01)
*G01S 13/931* (2020.01)
*G01S 7/02* (2006.01)

(52) U.S. Cl.
CPC .............. *G01S 7/03* (2013.01); *G01S 13/931* (2013.01); *G01S 7/027* (2021.05); *G01S 2013/93271* (2020.01)

(58) Field of Classification Search
CPC ...................... G01S 7/03; G01S 13/931; G01S 2013/93271; G01S 7/027
See application file for complete search history.

(56) References Cited

U.S. PATENT DOCUMENTS

| 4,760,497 | A | 7/1988 | Roston | |
| 5,911,395 | A | 6/1999 | Hussaini | |
| 6,556,166 | B1 | 4/2003 | Searcy et al. | |
| 8,994,580 | B2 * | 3/2015 | Weber | G01S 7/4026 |
| | | | | 342/174 |
| 10,288,720 | B1 | 5/2019 | Adolf et al. | |
| 10,562,464 | B2 | 2/2020 | Koulas | |
| 2008/0035806 | A1 | 2/2008 | Sporay et al. | |
| 2010/0188296 | A1 * | 7/2010 | Gard | G01F 23/284 |
| | | | | 343/702 |

FOREIGN PATENT DOCUMENTS

| DE | 102016113261 A1 | 1/2017 |
| WO | 2017200739 A1 | 11/2017 |
| WO | 2019110518 A1 | 6/2019 |

OTHER PUBLICATIONS

European Search Report dated Aug. 5, 2021. 7 pages.

* cited by examiner

*Primary Examiner* — Peter M Bythrow
*Assistant Examiner* — Nazra Nur Waheed
(74) *Attorney, Agent, or Firm* — RMCK Law Group, PLC

(57) ABSTRACT

A radar system comprises a radar device defining upper and lower pairs of mounting tabs and being configured to transmit and receive electromagnetic waves based on a squint angle, a mounting device configured to be attached to a surface and to receive the radar device, wherein the mounting device defines upper and lower pairs of connection position assurance (CPA) features that correspond to the upper and lower pairs of mounting tabs, and a pair of mounting tab caps configured to be selectively installed on the upper or lower pairs of mounting tabs to offset the squint angle of the radar device.

20 Claims, 4 Drawing Sheets

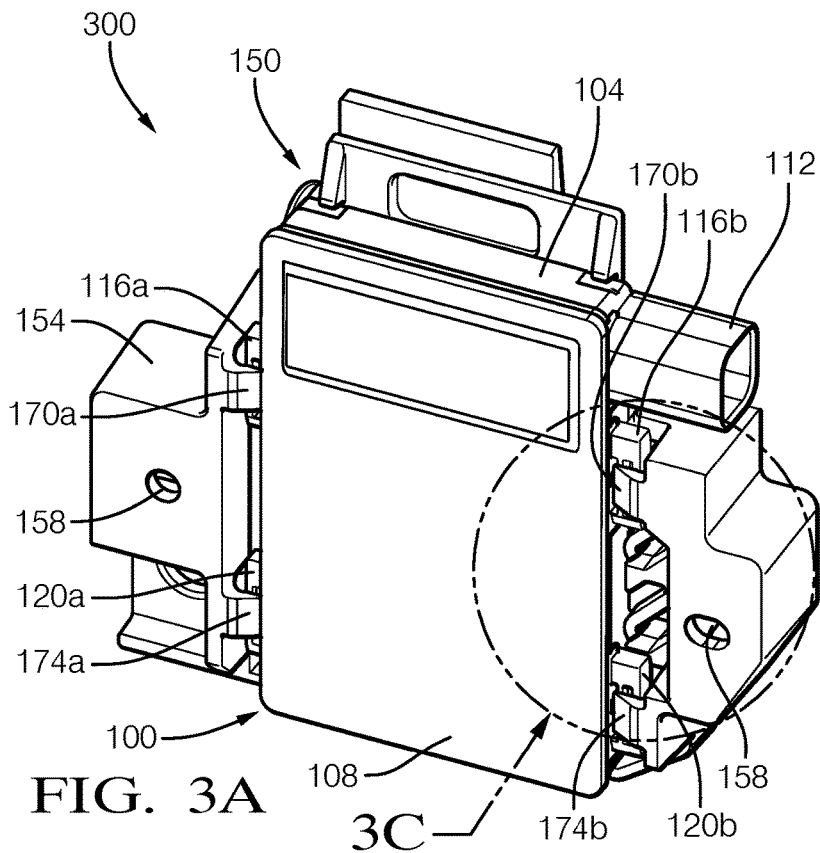
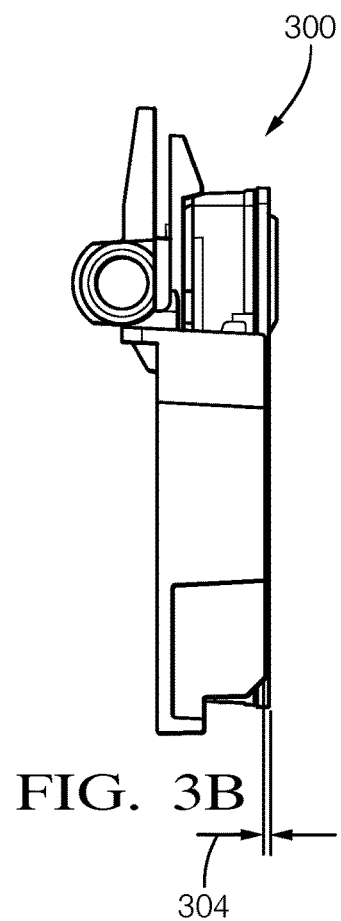
FIG. 3A FIG. 3B
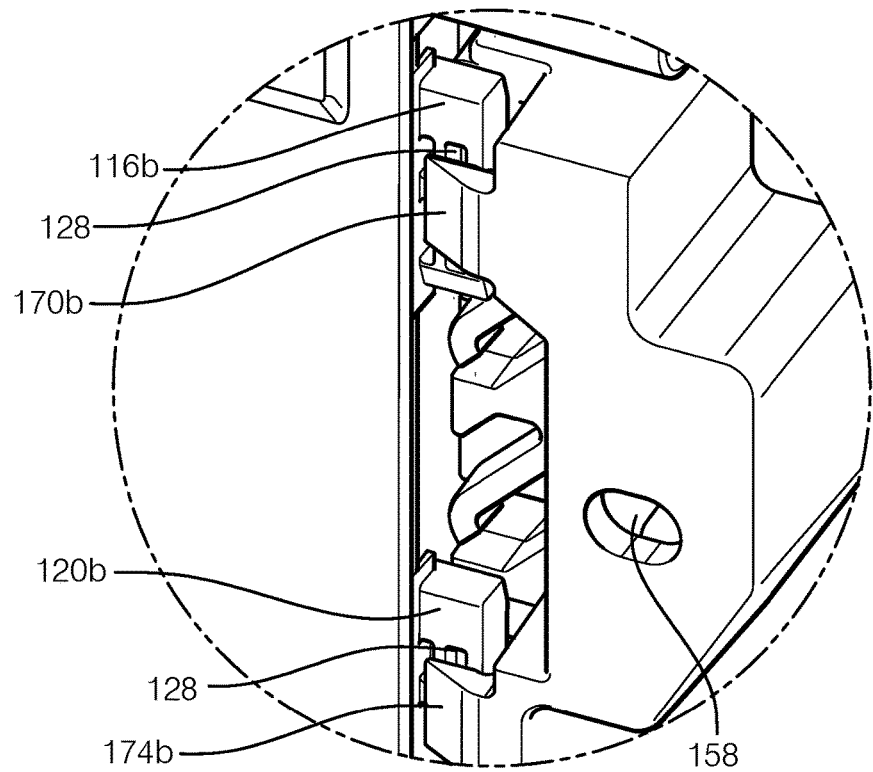
FIG. 3C

SQUINT-OFFSETTING RADAR MOUNTING TAB CAPS

FIELD

The present disclosure generally relates to radar devices and, more particularly, to systems and methods for offsetting a squint angle when mounting a radar device.

BACKGROUND

A radar device is configured to transmit and receive electromagnetic waves. In some radar device configurations (phased array, slotted waveguide, etc.), the electromagnetic waves are transmitted by a transmitter of the radar device at an angle that is offset from a normal of a plane of an antenna of the radar device. This offset angle is also known as a squint angle. The squint angle of a radar device could be due to a variety of factors, including, but not limited to, operating frequency, polarization, and orientation. If unaccounted for, the squint angle could negatively impact operation of the radar device (e.g., decreased bandwidth). For vehicle applications, this could be particularly problematic as radar devices are often utilized for detection of other vehicles or objects. Conventional radar device alignment systems and methods offset or compensate for the squint angle are complex and typically require multiple additional parts, such as a socket/nut/screw adjustment system and, in some cases, an additional adapter bracket. Accordingly, while these conventional radar device alignment systems and methods work well for their intended purpose, an opportunity exists for improvement in the relevant art.

The background description provided herein is for the purpose of generally presenting the context of the disclosure. Work of the presently named inventors,to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a radar system, is presented. In one exemplary implementation, the radar system comprises: a radar device defining upper and lower pairs of mounting tabs and being configured to transmit and receive electromagnetic waves based on a squint angle, a mounting device configured to be attached to a surface and to receive the radar device, wherein the mounting device defines upper and lower pairs of connection position assurance (CPA) features that correspond to the upper and lower pairs of mounting tabs, and a pair of mounting tab caps configured to be selectively installed on the upper or lower pairs of mounting tabs to offset the squint angle of the radar device.

In some implementations, the pair of mounting tab caps are configured to be installed on the upper pair of mounting tabs to offset a negative or downward squint angle of the radar device. In some implementations, the pair of mounting tab caps are configured to be installed on the lower pair of mounting tabs to offset a positive or upward squint angle of the radar device. In some implementations, the pair of mounting tab caps are configured to not be installed on either the upper or lower mounting tabs when a magnitude of the squint angle of the radar device is less than a predetermined threshold.

In some implementations, the upper and lower pairs of CPA features are spring clips. In some implementations, the pair of mounting tab caps are configured to be installed on the upper or lower mounting tabs prior to inserting the radar device into the mounting device. In some implementations, the squint angle of the radar device is predetermined. In some implementations, the mounting device is formed of a plastic material. In some implementations, the surface is a surface proximate to a front portion of a vehicle and the radar device is a front-facing radar device.

According to another aspect of the present disclosure, a method of installing a radar system is presented. In one exemplary implementation, the method comprises: obtaining a radar device defining upper and lower pairs of mounting tabs and being configured to transmit and receive electromagnetic waves based on a squint angle, obtaining a mounting device configured to receive the radar device and defining upper and lower pairs of connection position assurance (CPA) features that correspond to the upper and lower pairs of mounting tabs, attaching the mounting device to a surface, selective installing a pair of mounting tab caps on the upper or lower pairs of mounting tabs to offset the squint angle of the radar device, and inserting the radar device into the mounting device.

In some implementations, the pair of mounting tab caps are installed on the upper pair of mounting tabs to offset a negative or downward squint angle of the radar device. In some implementations, the pair of mounting tab caps are installed on the lower pair of mounting tabs to offset a positive or upward squint angle of the radar device. In some implementations, the pair of mounting tab caps are not installed on either the upper or lower mounting tabs when a magnitude of the squint angle of the radar device is less than a predetermined threshold.

In some implementations, the upper and lower pairs of CPA features are spring clips. In some implementations, the pair of mounting tab caps are installed on the upper or lower mounting tabs prior to inserting the radar device into the mounting device. In some implementations, the method further comprises predetermining the squint angle of the radar device. In some implementations, the mounting device is formed of a plastic material. In some implementations, the surface is a surface proximate to a front portion of a vehicle and the radar device is a front-facing radar device.

According to another aspect of the present disclosure, radar system, is presented. In one exemplary implementation, the radar system comprises: a radar means for transmitting and receiving electromagnetic waves based on a squint angle, the radar means defining upper and lower pairs of mounting feature means, a mounting means for attachment to a surface and for receiving the radar means, the mounting means defining upper and lower pairs of connection position assurance (CPA) feature means that correspond to the upper and lower pairs of mounting feature means, and a pair of mounting feature cap means for selective installation on the upper or lower pairs of mounting feature means to offset the squint angle of the radar means.

In some implementations, the pair of mounting feature cap means are for installation on the upper pair of mounting feature means to offset a negative or downward squint angle of the radar means, and the pair of mounting feature cap means are for installation on the lower pair of mounting feature means to offset a positive or upward squint angle of the radar means.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A-3C illustrate views of a second configuration of the radar device mounted in the mounting device without the mounting tab caps installed according to some implementations of the present disclosure.

DETAILED DESCRIPTION

Figure 1:
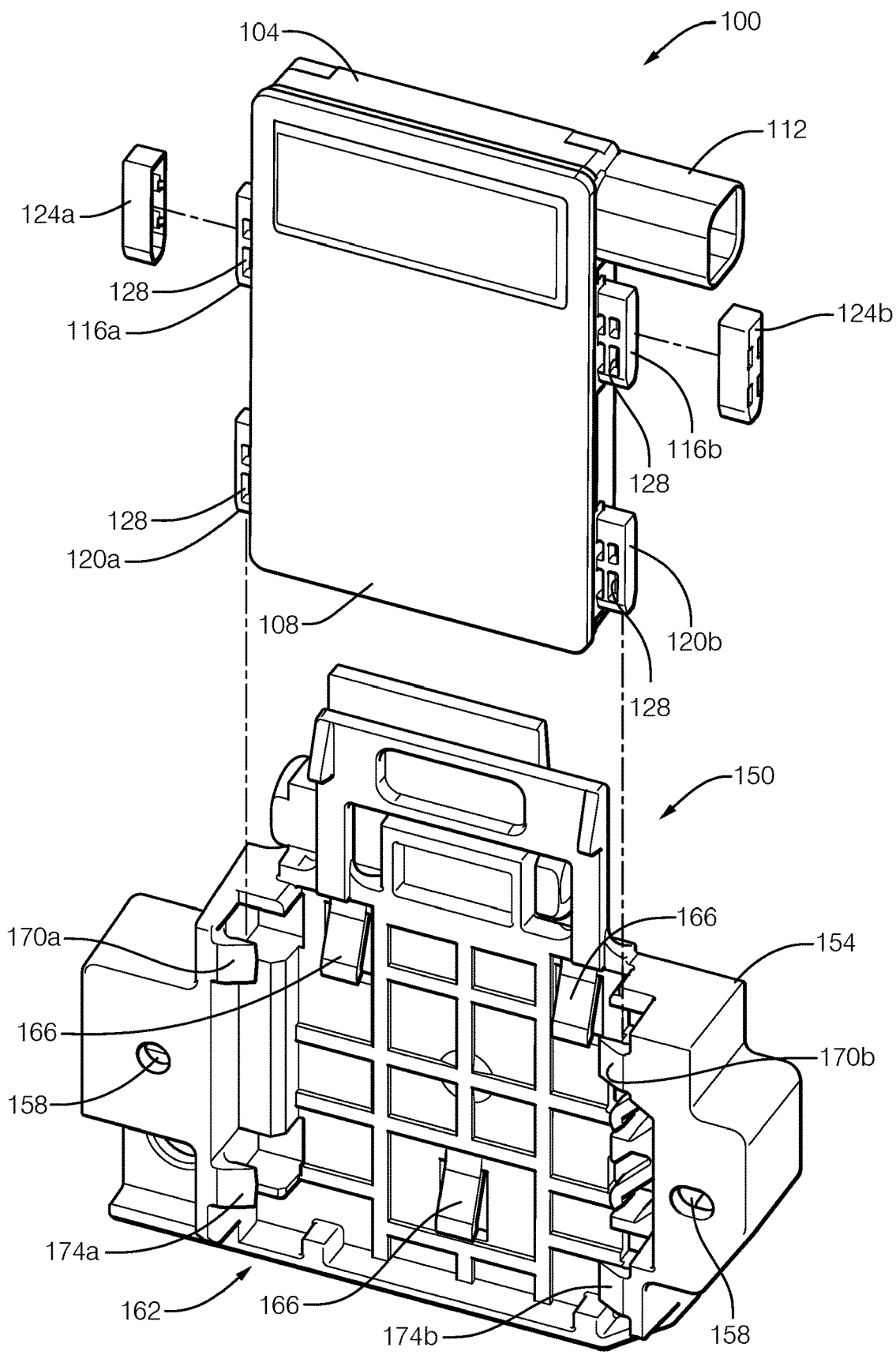
FIG. 1 illustrates an exploded view of a radar device, a mounting device, and a pair of mounting tab caps for offsetting a squint angle of the radar device according to some implementations of the present disclosure.

Referring now to FIG. 1, an exploded view of an example configuration of radar system according to some implementations of the present disclosure is illustrated. The radar system comprises a radar device 100 comprising a housing 104 that houses electronic components (not shown) of the radar device 100. These electronic components include, but are not limited to, a transmitter and an antenna or receiver. The antenna is arranged parallel to a plane defined by a front surface 108 of the housing 104. The transmitter, however, may transmit electromagnetic waves based on a squint angle relative to the plane defined by the front surface 108 of the housing 104. The electronic components (transmitter, antenna, etc.) are electrically connected to one or more other systems (e.g., a vehicle controller) via electrical connector 112. The housing 104 of the radar device 100 further defines an upper pair of mounting tabs 116a, 116b and a lower pair of mounting tabs 120a, 120b. A pair of mounting tab caps 124a, 124b are selectively installable either on the upper pair of mounting tabs 116a, 116b (as shown) or on the lower pair of mounting tabs 120a, 120b. For example, these mounting tab caps 124a, 124b may securely engage connection position assurance (CPA) features 128 of the respective mounting tabs 116a, 116b, 120a, 120b. It will be appreciated that the illustrated designs/configurations of the mounting tabs 116a, 116b, 120a, 120b and the mounting tab caps 124a, 124b are merely exemplary and are not intended to limit the scope of the present disclosure. It will be appreciated that other suitable mounting features and mounting feature caps could be utilized in a similar manner to achieve the same goal of squint angle offsetting or compensation.

The radar system further comprises a mounting device 150 that is configured to be attached to a surface. In one exemplary vehicle application, the mounting device 150 is attached to a surface proximate to a front portion of a vehicle (not shown), such as inside a front bumper or grill of the vehicle (e.g., for a front-facing application of the radar device 100). More specifically, the mounting device 150 comprises a housing 154 that defines mounting features (e.g., screw holes) for attaching the mounting device 150 to the surface. In one exemplary implementation, the mounting device 150 is formed of one or more plastic materials (e.g., via injection molding), such as, but not limited to, polycarbonate (PC) or acrylonitrile butadiene styrene (ABS). A plastic configuration of the mounting device 150 can provide for decreased costs and/or decreased weight, such as compared to metal configurations (e.g., a stamped metal mounting device). The housing 154 of the mounting device 150 generally defines a slot 162 for receiving the radar device 100. The housing 154 defines a first set of CPA features 166 (e.g., spring clips) for securely engaging a back surface of the radar device 100 and a second set of CPA features 170a, 170b, 174a, 174b (e.g., spring clips) for securely engaging the mounting tabs 116a, 116b, 120a, 120b of the radar device 100. This second set of CPA features 170a, 170b, 174a, 174b may also be described as an upper pair of CPA features 170a, 170b and a lower pair of CPA features 174a, 174b. Based on the selective installation of the mounting tab caps 124a, 124b, the radar device 100 is able to be tilted up or down to offset of compensate for its squint angle.

Figure 2A:
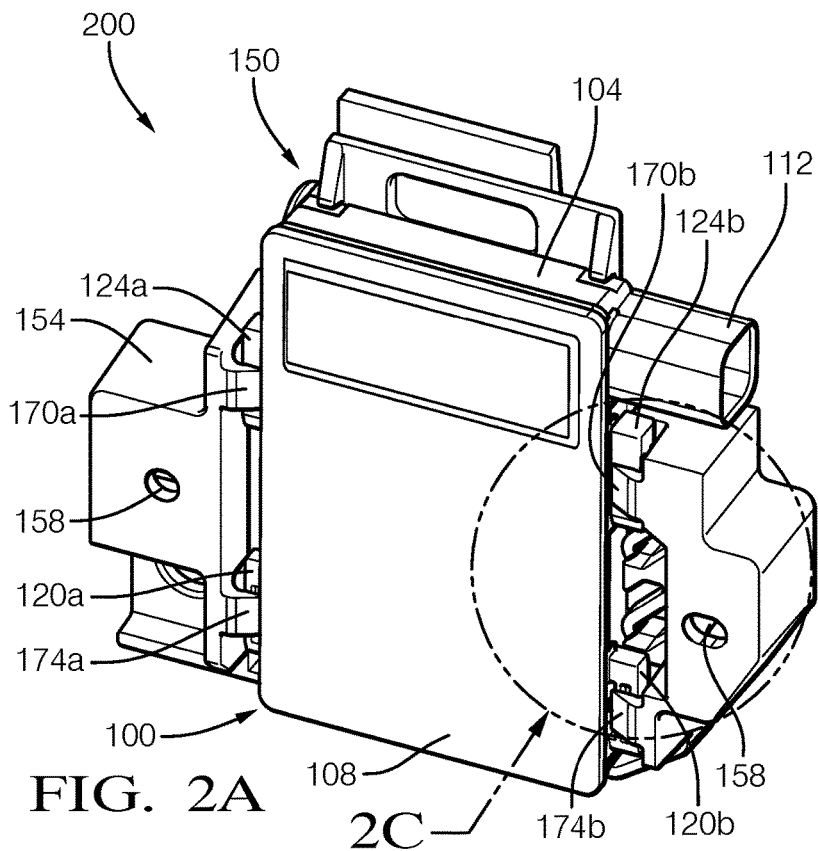
FIGS. 2A-2C illustrate views of a first configuration of the radar device mounted in the mounting device with the mounting tab caps installed on an upper pair of mounting tabs of the radar device according to some implementations of the present disclosure.
Figure 2B:
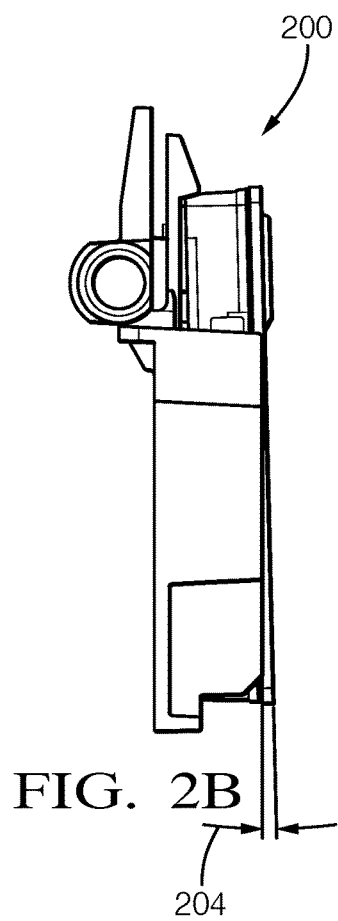
Figure 2C:
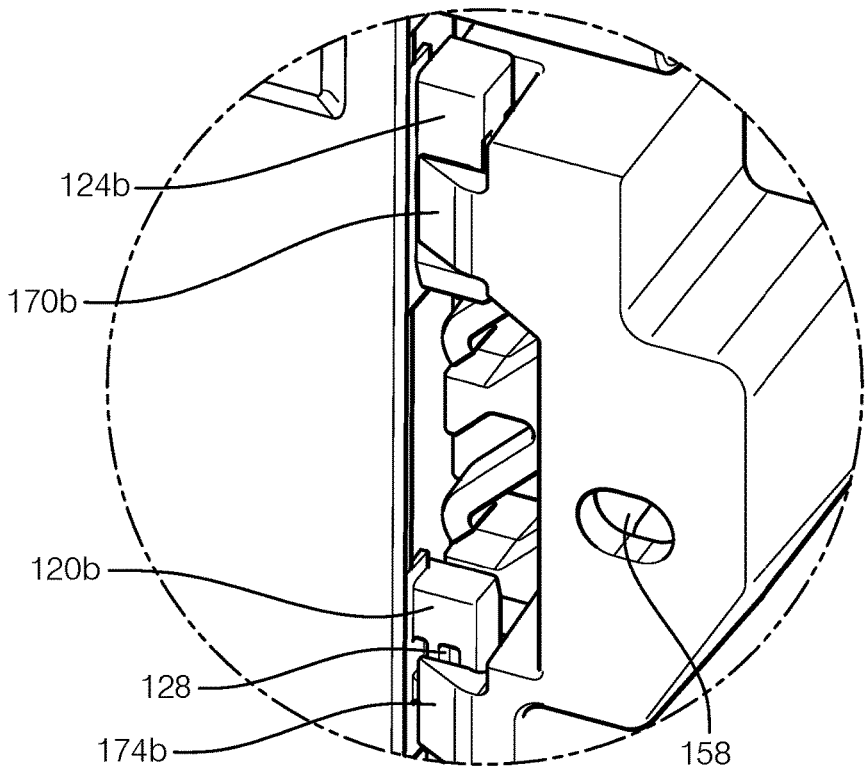
Figure 4A:
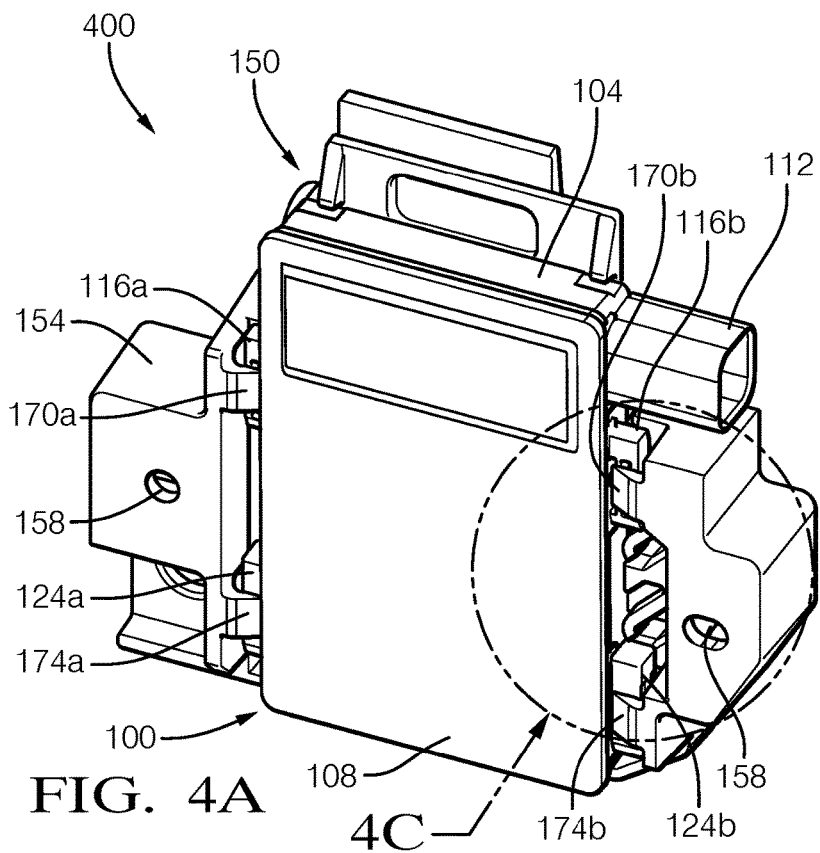
FIGS. 4A-4C illustrate views of a third configuration of the radar device mounted in the mounting device with the mounting tab caps installed on a lower pair of mounting tabs of the radar device according to some implementations of the present disclosure.
Figure 4B:
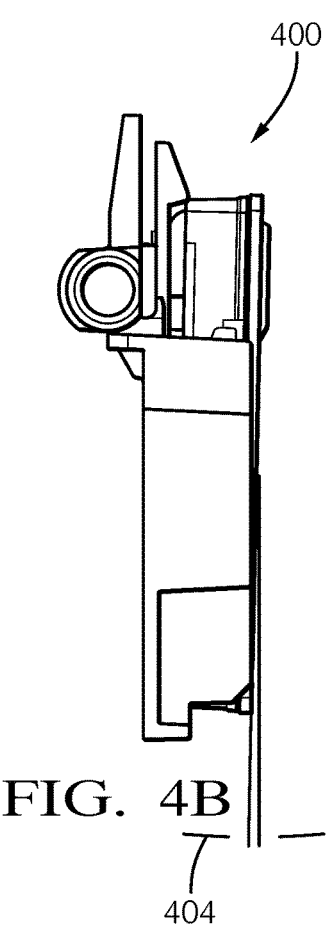
Figure 4C:
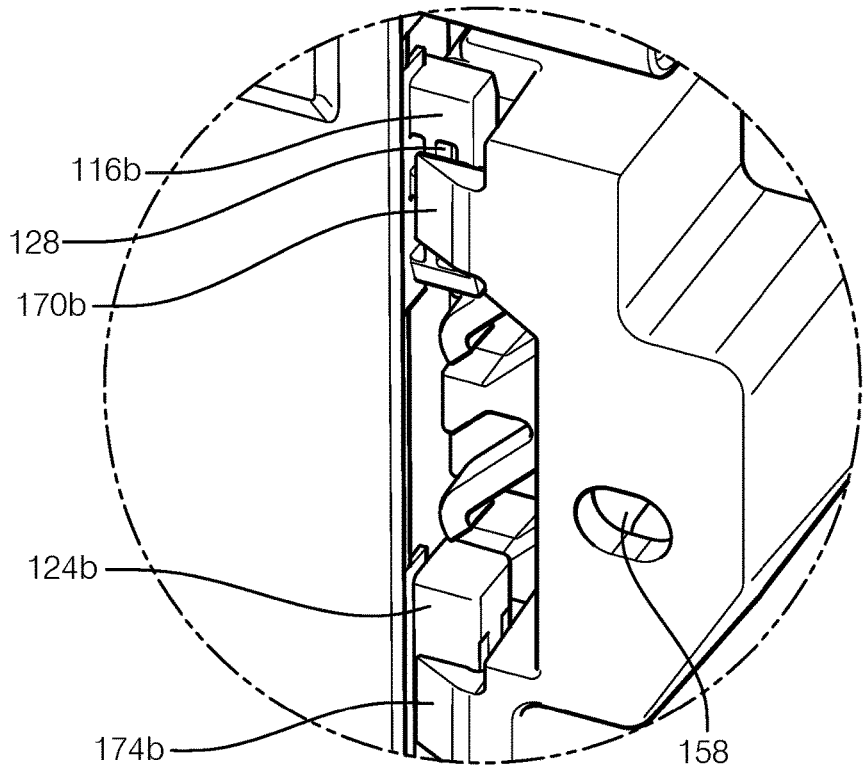

In a first configuration 200 in FIGS. 2A-2C, for example, the mounting tab caps 124a, 124b are installed on the upper pair of mounting tabs 116a, 116b, respectively. When the radar device 100 is subsequently inserted into the mounting device 150, the radar device 100 (i.e., the plane defined by its front surface 108) will be tilted upward (see offset angle 204). This first configuration 200 can be utilized to offset or compensate for a negative or downward squint angle. In a second configuration 300 in FIGS. 3A-3C, the mounting tab caps 124a, 124b are not installed (see offset angle 304). This second configuration 300 can be utilized when a magnitude (absolute value) of the squint angle of the radar device 100 is less than a predetermined threshold. This predetermined threshold could be, for example, an acceptable squint angle for proper operation of the radar device 100. In a third configuration 400 in FIGS. 4A-4C, the mounting tab caps 124a, 124b are installed on the lower pair of mounting tabs 120a, 120b, respectively. When the radar device 100 is subsequently inserted into the mounting device 150, the radar device 100 (i.e., the plane defined by its front surface 108) will be tilted downward (see offset angle 404). This third configuration 400 can be utilized to offset or compensate for a positive or upward squint angle. In some implementations, different sets or configurations (different colors, different barcodes, etc.) for the mounting tab caps 124a, 124b could be utilized for installation on the upper pair of mounting tabs 116a, 116b compared to installation on the lower pair of mounting tabs 120a, 120b. This could provide for easier installation configuration verification by a human or robotic installer. It will also be appreciated that multiple sets of mounting tab caps 124a, 124b could be utilized to provide for even further squint angle offsetting or compensation. For example, two different sets of mounting tab caps 124a, 124b could be provided, each set having a different thickness, and only one (or both) pairs of mounting tab caps 124a, 124b could be selectively installed.

In another aspect of the present disclosure, a method of installing the radar system is presented. This method can include obtaining the radar device 100 and the mounting device 150. The method can also include determining the squint angle of the radar device 100. This squint angle could be predetermined, either by a manufacturer of the radar device 100 or via testing of the radar device 100. Based on the squint angle, the mounting tab caps 124a, 124b are selectively installed (upper, lower, or none) to offset or compensate for the squint angle of the radar device 100. The mounting device 150 is then attached to the surface (e.g., a surface proximate to front portion of a vehicle, not shown) and the radar device 100 is inserted into the mounting device 150 to complete the installation of the radar system. It will be appreciated that the radar device 100 could also be inserted into the mounting device 150 prior to attachment of the mounting device to the surface. The installation method could further include electrically connecting the radar device 100 via electrical connector 112 to another electrical system (e.g., a controller of the vehicle), which could then utilize measurements of the radar device 100 for various functionality (object/vehicle detection, adaptive cruise control, etc.). It will be appreciated that this installation method could be performed by a human installer, a robotic installer, or some combination thereof. For example only, the robotic installer could perform all of the above-described steps according to a set of instructions stored on a non-transitory computer-readable medium and executed by one or more processors.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A radar system, comprising:
    a radar device defining upper and lower pairs of mounting tabs each defining a first size and being configured to transmit and receive electromagnetic waves based on a squint angle;
    a mounting device configured to be attached to a surface and to receive the radar device, wherein the mounting device defines upper and lower pairs of connection position assurance (CPA) features that correspond to the upper and lower pairs of mounting tabs; and
    a pair of mounting tab caps each defining a predetermined second size that is larger than the first size such that the pair of mounting tab caps are configured to be selectively installed on the upper or lower pairs of mounting tabs to adjust an angle of the mounting device and correspondingly offset the squint angle of the radar device by a predetermined amount based on the predetermined second size.

2. The radar system of claim 1, wherein the pair of mounting tab caps are configured to be installed on the upper pair of mounting tabs to offset a negative or downward squint angle of the radar device.

3. The radar system of claim 1, wherein the pair of mounting tab caps are configured to be installed on the lower pair of mounting tabs to offset a positive or upward squint angle of the radar device.

4. The radar system of claim 1, wherein the upper and lower pairs of CPA features are spring clips.

5. The radar system of claim 1, wherein the pair of mounting tab caps are configured to be installed on the upper or lower mounting tabs prior to inserting the radar device into the mounting device.

6. The radar system of claim 1, wherein the squint angle of the radar device is predetermined.

7. The radar system of claim 1, wherein the mounting device is formed of a plastic material.

8. The radar system of claim 1, wherein the surface is a surface proximate to a front portion of a vehicle and the radar device is a front-facing radar device.

9. The radar system of claim 1, wherein the pair of mounting tab caps are selected from a plurality of different pairs of mounting tab caps each having a different respective predetermined second size.

10. A method of installing a radar system, the method comprising:
    obtaining a radar device defining upper and lower pairs of mounting tabs each defining a first size and being configured to transmit and receive electromagnetic waves based on a squint angle;
    obtaining a mounting device configured to receive the radar device and defining upper and lower pairs of connection position assurance (CPA) features that correspond to the upper and lower pairs of mounting tabs;
    attaching the mounting device to a surface;
    selectively installing a pair of mounting tab caps, each defining a predetermined second size that is larger than the first size, on the upper or lower pairs of mounting tabs to adjust an angle of the mounting device and correspondingly offset the squint angle of the radar device by a predetermined amount based on the predetermined second size; and
    inserting the radar device into the mounting device.

11. The method of claim 10, wherein the pair of mounting tab caps are installed on the upper pair of mounting tabs to offset a negative or downward squint angle of the radar device.

12. The method of claim 10, wherein the pair of mounting tab caps are installed on the lower pair of mounting tabs to offset a positive or upward squint angle of the radar device.

13. The method of claim 10, wherein the upper and lower pairs of CPA features are spring clips.

14. The method of claim 10, wherein the pair of mounting tab caps are installed on the upper or lower mounting tabs prior to inserting the radar device into the mounting device.

15. The method of claim 10, further comprising predetermining the squint angle of the radar device.

16. The method of claim 10, wherein the mounting device is formed of a plastic material.

17. The method of claim 10, wherein the surface is a surface proximate to a front portion of a vehicle and the radar device is a front-facing radar device.

18. The method of claim 10, further comprising selecting the pair of mounting tab caps from a plurality of different pairs of mounting tab caps each having a different respective predetermined second size.

19. A radar system, comprising:
    a radar means for transmitting and receiving electromagnetic waves based on a squint angle, the radar means defining upper and lower pairs of mounting feature means each defining a first size;
    a mounting means for attachment to a surface and for receiving the radar means, the mounting means defining upper and lower pairs of connection position assurance (CPA) feature means that correspond to the upper and lower pairs of mounting feature means; and a pair of mounting feature cap means each defining a predetermined second size that is larger than the first size such that the pair of mounting tab cap means are for selective installation on the upper or lower pairs of mounting feature means to adjust an angle of the mounting device means and correspondingly offset the squint angle of the radar means by a predetermined amount based on the predetermined second size.

20. The radar system of claim 19, wherein:

the pair of mounting feature cap means are for installation on the upper pair of mounting feature means to offset a negative or downward squint angle of the radar means; and the pair of mounting feature cap means are for installation on the lower pair of mounting feature means to offset a positive or upward squint angle of the radar means.

\* \* \* \* \*